United States Patent [19]

Fekete, deceased

[11] 4,430,390

[45] Feb. 7, 1984

[54] COMPACT FUEL CELL STACK

[75] Inventor: Imre Fekete, deceased, late of Piscataway, N.J., by Anna M. Fekete, administrator

[73] Assignee: Engelhard Corporation, Iselin, N.J.

[21] Appl. No.: 422,046

[22] Filed: Sep. 23, 1982

[51] Int. Cl.³ .............................................. H01M 8/04
[52] U.S. Cl. .......................................... 429/34; 429/37
[58] Field of Search ....................... 429/34, 37, 38, 39, 429/12, 66

[56] References Cited

U.S. PATENT DOCUMENTS 2,594,713  4/1952  Andre ..................................... 429/66
3,253,958  5/1966  Shinn ..................................... 429/37
3,573,104  3/1971  Snyder, Jr. et al. .................. 429/37

Primary Examiner—Anthony Skapars

[57] ABSTRACT

A compact fuel cell stack in which a plurality of fuel cells are arranged in a stack between end plates. Resilient means such as springs are connected between the end plates, imposing on the end plates a force which urges the end plates together to apply a predetermined compressive loading to the cells. The springs are entirely disposed in the space between the end plates and do not extend exteriorly above or below the end plates, thereby reducing the overall stack height and weight as compared with conventional structures. Force adjusting means to adjust the force imposed by the resilient means are preferably included.

14 Claims, 3 Drawing Figures

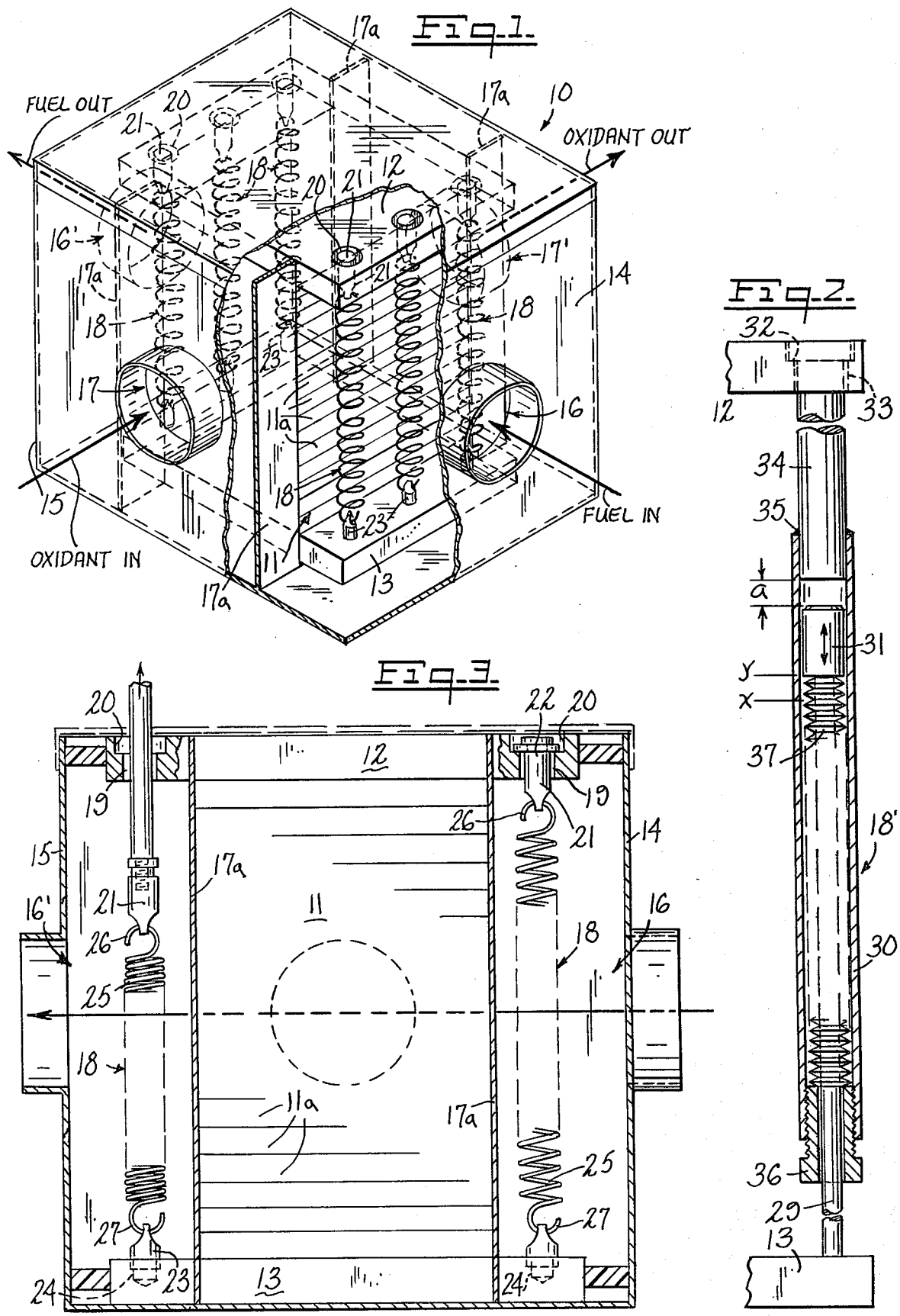

COMPACT FUEL CELL STACK

BACKGROUND OF THE INVENTION

1. Field of the Invention

This invention relates generally to fuel cells, and more particularly, to means for mechanically retaining a plurality of electrically connected fuel cells in a stack, more specifically to a means for applying compressive loading to the stacked fuel cells.

2. Description of the Prior Art

A fuel cell basically comprises an anode electrode spaced apart from a cathode electrode with an electrolyte disposed between the two electrodes. Typically, each electrode may comprise a thin catalyst layer adjacent to the electrolyte and disposed upon a layer of support material or substrate. A reactant gas compartment is behind the substrate, and the substrate is porous to gas in a direction perpendicular to its opposite faces, i.e., across the thickness dimension of the plate, so that reactant gas may diffuse therethrough to the catalyst layer. An electro-chemical reaction occurs at the gas-/electrolyte/catalyst interface whereby ions travel from one electrode to the other through the electrolyte, producing useable electrical energy.

In order to obtain commercially useful amounts of electric power, it is necessary to stack a plurality of cells and connect them electrically in series. Electrically conductive, gas-impermeable plates usually separate the anode of one cell from the cathode of the next adjacent cell. The voltage across the stack is the sum of the voltage drops across the individual cells and is a function of the current produced by each cell. Further, the amount of current produced by each cell is directly proportional to the amount of reactant gas utilized in the electro-chemical reaction.

An important factor affecting the performance of fuel cells is the clamping pressure exerted upon the cells as they are held together in the assembled stack. For instance, the ion diffusion and the electro-chemical action of the cell is significantly affected by only small changes in contact pressure between the electro-chemically active materials of the cell. Recognition of this fact is disclosed in U.S. Pat. No. 2,594,713, which shows in FIG. 1 thereof a test apparatus for analyzing the effects on the performance of the cell stack of pressure variation between the cells.

U.S. Pat. Nos. 3,012,086, 3,253,958, 3,356,535, 3,444,714 and 3,982,961 all disclose various fuel cell stack constructions in which a plurality of cells are held together in assembled relationship by a plurality of tie bolts or rods. Additionally, U.S. Pat. No. 3,253,958 discloses a resilient follow-up means for compensating for stack compression. U.S. Pat. No. 3,232,950 discloses a fuel cell construction in which a fuel electrode 2 and an oxidant electrode 3 are in intimate contact with opposite sides of an electrolyte carrier or disk 1. The electrodes are urged against the electrolyte disk by means of springs 13 and 14 engaged against the electrodes and end plates or caps 17 and 18. U.S. Pat. No. 949,619, not concerned with fuel cells, discloses a box structure in which tension springs engage lids to retain them on the box.

Conventional fuel cell stack designs are seen to employ tie-rods and compressive loading elements to initially apply and later maintain the required cell compressive loading to the cell stack. As exemplified by the prior art described above, these compressive loading elements are typically disposed outboard of the top and bottom end plates of the fuel cell stack. One typical conventional construction utilizes tie-rod extensions projecting beyond the end plates with helical compression springs fitted over the extensions and compressed by means of equally torqued locking hex-nuts.

Such conventional prior art constructions suffer from several disadvantages. For instance, a major disadvantage of such designs is in the limited load follow-up capability. Since the spring rate is high, cell compression significantly decreases as the stack shrinks during operation of the stack and periodic retensioning of the compressive loading elements is necessary. The impact of shrinkage of the cell stack may be counteracted by selected longer springs. However, this leads to increased stack height, since the compressive load elements are disposed outboard of the end plates in conventional structures.

Another known construction utilizes tie-rods placed externally of the reactant manifolds and operatively connected with parallel bars placed over the end plates to exert a clamping force to the end plates. In this configuration, the bars function essentially as leaf springs. This structure yields a low stack height but requires a larger effective cross-section area of the assembled cell stack. In addition, a leaf spring configuration of this type has a limited spring excursion capability which may not be sufficient to take up the full extent of stack shrinkage.

SUMMARY OF THE INVENTION

Accordingly, it is a principal object of this invention to provide a fuel cell stack of reduced height and weight in comparison with the prior art structures.

Another object of the invention is to provide a fuel cell stack having a simple self-regulating compressive load follow-up system while at the same time achieving reduced stack height. Yet another object of the invention is to provide a fuel cell stack construction in which compressive loading elements may be disposed entirely between the end plates of the stack and may be enclosed within the gas flow manifolding for the stack.

These and other objects and advantages of the invention are achieved in a fuel cell stack construction as follows. The fuel cell stack comprises a plurality of fuel cells connected in superposed, stacked relationship, with first and second support end plates on opposite ends of the stack of fuel cells. Resilient means engage the first and second end plates to impose thereon a force urging the first and second end plates towards each other, whereby the fuel cells are held together under a predetermined compressive loading. the resilient means are disposed substantially entirely within the space defined between the first and second end plates and the planes within which the end plates lie, whereby the height of the resilient means is not substantially greater than the combined height of the fuel cells and end plates.

The fuel cell stack of the invention generally comprises fuel cells comprising an anode electrode, a cathode electrode and an electrolyte disposed therebetween.

In accordance with one aspect of the invention, the resilient means may comprise spring means such as, e.g., a coil spring placed under tension by the end plates.

In another aspect of the invention, the resilient means may comprise a first rigid member having a base end connected to one of the end plates and a free distal end, a second rigid member having a base end connected to the other one of the end plates and a free distal end, the respective lengths of the first and second rigid members being such that the respective distal ends thereof extend beyond each other whereby the distal end of the first member is closer to the base end of the second member than is the distal end of the second member, and vice-versa. A resilient, compressible member is engaged under compression between the first and second distal ends, thereby imposing on the rigid members and on the end plates a force urging the end plates towards each other.

In another aspect of the invention, force adjusting means operatively associated with the spring means may be included to adjust the force imposed upon the end plates by the resilient means.

The fuel cells may be of generally rectangular configuration in plan view and enclosed within a housing having manifold means for supplying and exhausting fuel and oxidant to and from said fuel cells. The resilient means may be disposed within the manifold means.

BRIEF DESCRIPTION OF THE DRAWINGS

In the drawings, preferred embodiments of the invention are illustrated, wherein like reference characters designate like parts throughout the several views, and wherein:

FIG. 1 is a somewhat diagrammatic perspective view of a fuel cell stack in accordance with the invention, with portions broken away;

FIG. 2 is an enlarged vertical sectional view of a fuel cell stack such as shown in FIG. 1, with one of the resilient load follow-up means shown in position at the right hand side of the figure and another resilient load follow-up means shown in the process of being installed at the left hand side of the figure; and FIG. 3 is a greatly enlarged, fragmentary, vertical sectional view of a portion of another embodiment of the invention, wherein the resilient load follow-up means is of telescopic configuration.

DETAILED DESCRIPTION OF THE PREFERRED EMBODIMENTS

A fuel cell stack in accordance with the invention is indicated generally at 10 in FIG. 1 and comprises a stack 11 of a plurality of fuel cells 11a held between a pair of opposite end plates 12 and 13. A housing 14, 15 encloses the fuel cells 11a and has suitable manifolding 16, 16' and 17, 17' for supplying and exhausting a fuel (16, 16') and oxidant (17, 17') to and from the stack of fuel cells 11a. Strips 17a segregate fuel and oxidant.

With further reference to FIGS. 1 and 2, the end plates 12 and 13 are held in compressive contact with the ends of the stack of fuel cells 11 by means of resilient means elements 18 engaging end plates 12, 13 and extending between, and not extending exteriorly beyond, end plates 12, 13 and enclosed within stack manifolding 16 and 16' (fuel side). End plates 12, 13 are seen to extend beyond the sides of stack 11 of fuel cells at opposite sides thereof to provide clearance within housing 10 for elements 18.

As shown in FIGS. 1 and 2, the top end plate 12 has a plurality of holes 19 formed therethrough with the holes being counterbored or enlarged at their upper ends at 20. A spring retaining pin 21 is inserted through the hole 19 and has an enlarged head 22 on the upper end thereof, such as a threaded nut or the like, to prevent the pin from passing downwardly through the hole. A corresponding pin 23 is engaged with the bottom end plate 13 and may be identical to the pin 21, or as shown, may comprise a threaded stud threadably engaged in a mating hole 24 formed in the inner facing surface of the plate 13. Alternatively, the pin 23 could be press-fitted or welded or otherwise secured to the plate 13.

The compressive load follow-up element 18 in this form of the invention comprises an extension coil spring 25 having hooked ends 26 and 27 engaged with the pins 21 and 23.

An extension spring 25 is shown being installed at the left hand side of FIG. 2. To install the spring 25, the end 27 is first engaged with pin 23 and a pull-rod 28 fastened to a jack (not shown) is secured to the pin 21 which is, in turn, connected with end 26 of spring 25. Pull rod 28 is pulled upwardly, as viewed in FIG. 2, in the direction indicated by the arrow, to extend spring 25 and position pin 21 above hole 19 for application to pin 21 of the enlarged head 22 thereto, to retain the pin and spring in position, as shown at the right hand side of FIG. 2, when pull rod 28 is released, and removed from pin 21.

With the construction thus described, stack height is reduced significantly since the fasteners that anchor the ends of the extension springs to the end plates are disposed internally of the assembly, i.e., they do not exceed exteriorly of end plates 12, 13. Moreover, although the outside diameter of the spring will be greater than that of a conventionally used tie-rod, the springs may conveniently be disposed within the gas flow manifold because reactant flow restriction is minimal through the extended spring coils. The extension springs are designed to compensate for the total shrinkage which the stack will undergo in use, and still maintain compression force between the cells within design limits. This is accomplished by selecting a suitable compromise between the spring rate and the maximum travel resulting from shrinkage of the cells.

A modification of the invention is illustrated in FIG. 3, wherein the resilient means 18' comprises a pair of telescopically engaged rods 29 and 30. Rod 29 is suitably fixed at its lower end to the bottom end plate 13 and has an enlarged head 31 on its upper end slidably received within the tubular rod 30. The tubular rod 30 is suitably secured at its upper end to the top end plate 12, as by means of an enlarged head 32 received in a counterbored hole 33 in the end plate 12, for example. The upper end 34 of tubular rod 30 comprises a solid cylindrical member to which the tubular rod 30 is welded or otherwise suitably secured as at 35. A preload or force adjusting member 36 is threadably engaged in the lower end of tubular rod 30 and slides upon rod 29. Suitable spring means such as Belleville disks 37 (other resilient means such as, for example, a compressed helical spring may also be utilized) are engaged in the annular space between rod 29 and tubular rod 30, between the threaded preload or force adjusting member 36 and the head 31, to urge the rods 29 and 30 toward one another, causing end plates 12, 13 to compress the stack of fuel cells. As shown in FIG. 3, the tubular rods initially have positions spaced apart a distance "a". As the cells compress during use, the distance "a" decreases.

Dimensional changes of fuel cells are caused by creep and differential thermal expansion of the stack components. For example, in one particular fuel cell construction, the accumulated creep at the end of stack life is estimated to be 0.005 to 0.006 inch/cell (0.127 to 0.152 millimeters/cell). For example, in a preferred form of construction according to FIG. 3, a stack of fuel cells having a cell surface area of 14"×10.6"=148.4 square inches (35.56 cm×26.92 cm=957.42 square centimeters) is a subject to creep as described above. It may be preferentially desired, for example to maintain the compressive loading on the fuel cell stack at 50 PSI±10 PSI (3.52 Kg/cm$^2$±0.7 Kg/cm$^2$). For a stack of eighty-two cells, for example, each subject to 0.005 to 0.006 inch (0.127 to 0.152 millimeter) shrinkage, the anticipated total shrinkage over life of the unit would be 0.41 to 0.49 inches (1.04 to 1.24 cm).

The fuel cells are stacked in a device according to FIG. 3 wherein member 30 is preferentially of 1.38 inch (3.50 cm) outside diameter and has a wall thickness of 0.109 inches (0.277 cm). Compressible member 37 comprises a stack of Belleville disc springs of for example, 1.100 inch (2.794 cm) outside diameter and 0.559 inch (1.420 cm) inside diameter. Member 29 is sized to receive the Belleville springs stacked thereon.

The stack is assembled with six members as illustrated in FIG. 3, three each on opposite sides of the stack, and under a preloading (after final assembly of the fuel cells in accordance with the invention) of 1,372 lbs (622.9 Kg) per resilient member (a total of 8,232 lbs or 3737.4 Kg imposed by the six resilient members) for a compressive pressure on the fuel cell stack of 55 PSI 3.87 (Kg/cm$^2$). The bottom of head 31 is at this time at a position indicated by line x in FIG. 2. After the full anticipated extent of shrinkage of the stack, the bottom of head 31 will be at an elevation indicated by line y in FIG. 2, and the fuel cells will be under a load of 1,172 lbs (532.1 Kg) per each of the six members, or 47 PSI (3.30 Kg/cm$^2$). The range of compressive pressure is seen to be within ±10 PSI (±0.7 Kg/cm$^2$). The initial dimension of distance a is of course great enough to accommodate movement of member 29 and 30.

In place of the Belleville disks 37, a coil compression spring or the like could be engaged between the rods 29 and 30 to affect compressive loading. The compressive load follow-up element 18' in this form of the invention is also preferably disposed within the cell stack manifolding as in the previously described form of the invention, and may be installed following a similar procedure to that described in connection with FIGS. 1 and 2.

The threaded preload or force adjusting means 36 enables uniform compressive load distribution to be achieved among all six resilient means used in holding the end plates together. In other words, the load deflection curves of all the rods may be matched. Similar force or load adjusting means may be provided for the other embodiments of resilient means, e.g., for the coil springs illustrated in FIG. 2. For example, pin 21 or pin 23 or both could have a threaded two-part body, with the two parts axially moveable relative to each other, instead of the unitary body illustrated. Such two-piece construction would enable upward or downward movement (as viewed in FIG. 2) relative to end plates 12, 13 of the portions of pins 21 or 23 contacting springs 17, to thereby permit adjusting the tension imposed on springs 18.

The invention has been described in detail in connection with specific preferred embodiments thereof, but it will be appreciated that, upon a reading and understanding of the foregoing, other embodiments of the invention may occur to those skilled in the art.

Generally, it is in accordance with the invention to provide a resilient means comprising first and second rigid members as described above and in which the first rigid member is of tubular construction and the second rigid member is concentric therewith and extends telescopically therewithin to define an annular space between the first and second members.

Also in accordance with the invention, the force adjusting means used with such rigid member construction may comprise a stop mounted on the rigid member which is of tubular construction, for axial movement with respect thereto, and which engages a resilient compressible member whereby axial movement of the stop in one direction increases the compression imposed on the compressible means and axial movement in the opposite direction decreases the compression imposed on the compressible means. In this manner, the loading imposed on the fuel cells by the resilient means may be selectively adjusted by axial movement of the force adjusting means. Preferably, the first and second rigid members have respective stops affixed at or adjacent their respective distal ends and the resilient compressible member used in conjunction therewith may comprise a plurality of stacked belleville washers disposed in the annular space between the stops.

Generally, the first and second end plates are of rectangular configuration in plan view (as are fuel cell stacks in general) and one of the resilient means is engaged with the end plates at or adjacent to each of the four corners of the rectangular configuration. Preferably, the resilient means are substantially entirely disposed between the first and second end plates.

The invention generally also provides for force adjusting means which comprise a connecting member (e.g., pins 21 or 23 or a connecting member disposed at an intermediate position of a two-part spring corresponding to spring 25) engaging said resilient means and comprising at least two parts which are axially moveable relative to the longitudinal axis of said resilient means and relative to each other. In this way, axial movement of said parts relative to each other selectively adjusts the loading imposed on said fuel cells by said resilient means, by adjusting the force imposed on said end plates by said resilient means. The connecting member may also be disposed to connect one end of the resilient means to the end plate, e.g., pins 21 and 22.

What is claimed is:

1. A fuel cell stack comprising:
   a plurality of fuel cells connected in superposed, stacked relationship;
   first and second support end plates on opposite ends of the stack of fuel cells;
   resilient means engaging said first and second end plates to impose thereon a force urging said first and second end plates towards each other, whereby said fuel cells are held together under a predetermined compressive loading, said resilient means being disposed substantially entirely within the space defined between said first and second end plates and the planes within which said end plates lie, whereby the height of said resilient means is not substantially greater than the combined height of said fuel cells and end plates.

2. The fuel cell stack of claim 1, wherein said fuel cells comprise an anode electrode, a cathode electrode and an electrolyte disposed therebetween.

3. The fuel cell stack of claim 1 wherein said resilient means comprises spring means.

4. The fuel cell stack of claim 3 wherein said spring means comprises a coil spring placed under tension by said end plates.

5. The fuel cell stack of claim 1 wherein said resilient means comprises:
   a first rigid member having a base end connected to one of said end plates and a free distal end;
   a second rigid member having a base end connected to the other one of said end plates and a free distal end, the respective lengths of said first and second rigid members being such that the respective distal ends thereof extend beyond each other whereby the distal end of said first member is closer to the base end of said second member than is the distal end of said second member, and vice-versa; and
   a resilient, compressible member engaged under compression between said first and second distal ends thereby imposing on said rigid members and on said end plates a force urging said end plates towards each other.

6. The fuel cell stack of claim 1, claim 4 or claim 5 further including force adjusting means operatively associated with said spring means to adjust the force imposed upon said end plates by said resilient means.

7. The fuel cell stack of claim 5 wherein said first rigid member is of tubular construction and said second rigid member is concentric therewith and extends telescopically therewithin to define an annular space between said first and second members.

8. The fuel cell of claim 7 further including force adjusting means comprising a stop mounted on said rigid member of tubular construction for axial movement with respect thereto and engaging said resilient compressible member whereby axial movement of said stop in one direction increases the compression imposed on said compressible means and axial movement in the opposite direction decreases the compression imposed on said compressible means, so that the loading imposed on said fuel cells by said resilient means may be selectively adjusted by axial movement of said force adjusting means.

9. The fuel cell stack of claim 1, claim 4 or claim 5, further including a housing enclosing said fuel cells and having manifold means for supplying and exhausting fuel and oxidant to and from said fuel cells, and wherein said resilient means are disposed within said manifold means.

10. The fuel cell stack of claim 7 wherein said first and second rigid members have respective stops affixed at or adjacent their respective distal ends and said resilient compressible member comprises a plurality of stacked belleville washers disposed in said annular space between said stops.

11. The fuel cell stack of claim 1, claim 4 or claim 5 wherein said first and second plates are of rectangular configuration in plan view and one of said resilient means is engaged with said end plates at or adjacent to each of the four corners of said rectangular configuration.

12. The fuel cell stack of claim 1, claim 4, claim 5 or claim 10 wherein said resilient means are substantially entirely disposed between said first and second end plates.

13. The fuel cell stack of claim 6 wherein said force adjusting means comprises a connecting member engaging said resilient means, said connecting member comprising two parts which are axially moveable relative to the longitudinal axis of said resilient means and relative to each other, whereby axial movement of said parts relative to each other selectively adjusts the loading imposed on said fuel cells by said resilient means by adjusting the force imposed on said end plates by said resilient means.

14. The fuel cell stack of claim 13 wherein said connecting member connects one end of said resilient means to one of said end plates.

* * * * *